US009174399B2

(12) United States Patent
Watanabe et al.

(10) Patent No.: US 9,174,399 B2
(45) Date of Patent: Nov. 3, 2015

(54) MANUFACTURING METHOD OF OPTICAL DEVICE, AND OPTICAL DEVICE

(71) Applicant: FUJIFILM Corporation, Tokyo (JP)

(72) Inventors: Seiichi Watanabe, Saitama (JP); Kazumi Koike, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/331,407

(22) Filed: Jul. 15, 2014

(65) Prior Publication Data

US 2014/0319707 A1    Oct. 30, 2014

Related U.S. Application Data

(63) Continuation of application No. PCT/JP2013/050599, filed on Jan. 16, 2013.

(30) Foreign Application Priority Data

Jan. 17, 2012    (JP) .................................. 2012-007246

(51) Int. Cl.
  *B29D 11/00*    (2006.01)
  *B29C 43/02*    (2006.01)
  *B29C 43/36*    (2006.01)
  (Continued)

(52) U.S. Cl.
  CPC ........ *B29D 11/00009* (2013.01); *B29C 43/021* (2013.01); *B29C 43/36* (2013.01);
  (Continued)

(58) Field of Classification Search
  IPC ....... B29D 11/00009,11/0048, 11/00432; B29C 45/14336, 43/021, 43/36, 45/1418, 69/02; G02B 7/022; B29L 2011/0016
  See application file for complete search history.

(56) References Cited

FOREIGN PATENT DOCUMENTS

| JP | 60-196317 | 10/1985 |
|----|-----------|---------|
| JP | 02-164729 | 6/1990 |

(Continued)

OTHER PUBLICATIONS

International Search Report, PCT/JP2013/050599, May 7, 2013.
(Continued)

*Primary Examiner* — Mathieu Vargot
(74) *Attorney, Agent, or Firm* — Young & Thompson

(57) ABSTRACT

In order to produce high-quality optical elements stably at all times without the flow of molten resin inside an injection molding cavity being hindered by the protrusion of the outer peripheral edge of a lens after compression molding, a cavity formed when a pair of molds for molding is closed is provided with: an optical-function-part molding cavity (27); an annular connection-part molding cavity (28) connected to the outer peripheral edge of the optical-function-part molding cavity; and an edge-part molding cavity (29) connected to the outer peripheral edge of the connection-part molding cavity. In a compression molding step, a protrusion part is formed by making a portion of a compression molding material bulge out from the connection-part molding cavity into the edge-part molding cavity (29). In an injection molding step, the molds are filled by injecting an injection molding material into the edge-part molding cavity (29). The resin of the protrusion part that has protruded from the connection-part molding cavity into the edge-part molding cavity (29) is biased toward one direction of the molds so as not to hinder the flow of the injection molding resin. The biased amount is set such that, when the cross section of the resin that has protruded into the edge-part molding cavity (29) is divided by a perpendicular bisector (L) that is perpendicular to the optical axis and that divides the thickness of the connection part in half, the cross-sectional area on the biased side includes greater than or equal to 60% of the cross-sectional area of the protruded resin.

12 Claims, 12 Drawing Sheets

(51) Int. Cl.
*B29C 69/02* (2006.01)
*B29C 45/14* (2006.01)
*G02B 7/02* (2006.01)
*B29L 11/00* (2006.01)

(52) U.S. Cl.
CPC ........... *B29C45/14336* (2013.01); *B29C 69/02* (2013.01); *B29D 11/0048* (2013.01); *B29D 11/00432* (2013.01); *B29C 45/1418* (2013.01); *B29L 2011/0016* (2013.01); *G02B 7/022* (2013.01)

(56) References Cited

FOREIGN PATENT DOCUMENTS

| | | |
|---|---|---|
| JP | 05-66302 | 3/1993 |
| JP | 2007-022905 | 2/2007 |
| JP | 2008-155577 | 7/2008 |

OTHER PUBLICATIONS

Written Opinion, PCT/ISA/237, May 7, 2013.

MANUFACTURING METHOD OF OPTICAL DEVICE, AND OPTICAL DEVICE

CROSS-REFERENCE TO RELATED APPLICATIONS

This application is a Continuation of PCT International Application No. PCT/JP2013/050599 filed on Jan. 16, 2013, which claims priority under 35 U.S.C §119(a) to Japanese Patent Application No. 2012-007246 filed Jan. 17, 2012, all of which are hereby expressly incorporated by reference into the present application.

BACKGROUND OF THE INVENTION

1. Technical Field

The present invention relates to a manufacturing method of an optical device, and an optical device.

2. Description of the Related Art

A small-sized lens module is mounted on an optical system of an imaging unit to be mounted in devices, such as a cellular phone and a digital camera. With recent miniaturization and high functionality of devices, the design of the lens module is also improved and high-resolution image acquisition is possible. As for an optical device that constitutes the lens module, the optical device can be incorporated into the lens module on the basis of an edge part by integrally forming the edge part serving as a frame body at an outer periphery of an optical functional part. In that case, steps for assembling to a lens barrel or optical axis adjustment of a lens can be simplified. A manufacturing method of an optical device having such an edge part integrally is described in JP2007-022905A and JP1990-164729A (JP-H02-164729). In the manufacturing method of JP2007-022905A and JP1990-164729A (JP-H02-164729), an optical functional part is compression-molded by setting and compressing a preform within molds, and then, an edge part is injection-molded at an outer periphery of the optical functional part remaining in a state where the molds are closed.

SUMMARY OF THE INVENTION

The molds described in JP2007-022905A and JP1990-164729A (JP-H02-164729A) are constituted by two cavities including a compression molding cavity for compression molding and an injection molding cavity for injection molding. The optical functional part is molded by compression-molding the preform placed at a central portion of the molds through the operation of closing the molds, using the compression molding cavity. At this time, compression molding is performed after the molds are completely closed. Next, by injecting molten resin into the injection molding cavity from a gate provided in the molds, an edge part is molded so as to surround the optical functional part. Then, after the resin of the injection-molded edge part is cooled until the resin gets cold, the molds are opened and an optical device in which the optical functional part and the edge part adhere closely to each other is obtained. If an outer peripheral edge of the preform protrudes from the compression molding cavity to the injection molding cavity when the preform is compressed to mold an optical functional part, the injection molding cavity is narrowed. In that case, a flow path for the molten resin that flows out from the gate within the injection molding cavity is hindered by the outer peripheral edge of the protruded preform. The amount of protrusion of the preform during the compression molding does not becomes constant but varies depending on a compression molding material or compression molding conditions. Particularly when the preform is placed in the molds, the preform may be placed so as to deviate from the center position of the compression molding cavity. In that case, an outer peripheral edge of the optical functional part after the compression molding causes bias in a circumferential direction according to a positional deviation direction. As a result, the flow resistance of the molten resin during the injection molding varies at circumferential positions of the injection molding cavity, and the position of a weld line does not always become an always constant circumferential position. Additionally, there is a probability that the molten resin does not spread over the whole injection molding cavity due to the flow resistance, and sink marks and fragments may be created in a portion of the edge part.

Additionally, in JP1990-164729A (JP-H02-164729A), the contrivance of changing the diameter of an upper mold and a lower mold of the molds for compression molding to increase the area of adhesion between the molten resin and the optical functional part of a glass material during the injection molding of the edge part is conducted. However, JP1990-164729A (JP-H02-164729A) does not consider ensuring the flow path for the molten resin and making a suitable flow at all.

Thus, an object of the invention is to provide a manufacturing method of an optical device that can always stably produce high-quality optical devices without the flow of molten resin within an injection molding cavity being hindered by the protrusion of an outer peripheral edge of an optical functional part after compression molding, and an optical device produced by the method.

The invention has the following configurations.

(1) There is provided a manufacturing method of an optical device that obtains the optical device through molding processing using a pair of molding molds including a first mold and a second mold. Each of the pair of molding molds includes an optical functional part transfer surface that forms an optical functional part; a connecting part transfer surface that forms a connecting part stretching to an outer peripheral part of an optical functional surface; an inclination part transfer surface that forms an inclination part stretching to an outer peripheral part of the connecting part transfer surface; and an outer peripheral part transfer surface that forms an outer peripheral part stretching to the inclination part transfer surface. The pair of molding molds when being closed includes a cavity that is formed by an optical functional part molding cavity formed by the optical functional part transfer surfaces; a connecting part molding cavity formed by the connecting part transfer surfaces; and an edge part molding cavity formed by the inclination part transfer surfaces and the outer peripheral part transfer surfaces stretching to the inclination part transfer surfaces. The inclination part transfer surfaces of the first mold and the second mold have inclination angles that are widened such that the thickness of the optical device in an optical axis direction increases from the connecting part transfer surface side toward the outer peripheral part transfer surface side, respectively. The method includes a compression molding step of filling the optical functional part transfer surface of one mold of the pair of molding molds with a compression molding material having a smaller volume than the volume of the optical device, expanding the compression molding material while the molding molds being closed to transfer the shapes of the optical functional part transfer surfaces and the connecting part transfer surfaces of the molding molds to the compression molding material, and forming a protrusion part formed by a portion of the compression molding material bulging from the connecting part molding cavity to the edge part molding cavity side, and an injection molding step of filling the edge part molding cavity with a molten injection molding material in a state where the pair of molding molds are closed, and forming an injection-molded part at an outer periphery of the compression-molded compression molding material. The protrusion part is biased toward a mold of HS1 such that, when a cross-sectional shape of the protrusion part that has protruded from the connecting part molding cavity to the edge part molding cavity is divided into two by a perpendicular bisector that is perpendicular to an optical axis and bisects the thickness of the connecting part molding cavity in the optical axis direction, a side with a larger area is defined as the HS1, and a side with a smaller area is defined as HS2, the area of the HS1 is larger than or equal to 60% of the cross-sectional area of the protruded compression molding material.

(2) There is provided a manufacturing apparatus of an optical device that molds the optical device by using a pair of molding molds including a first mold and a second mold. Each of the pair of molding molds includes an optical functional part transfer surface that forms an optical functional part; a connecting part transfer surface that forms a connecting part stretching to an outer peripheral part of an optical functional surface; an inclination part transfer surface that forms an inclination part stretching to an outer peripheral part of the connecting part transfer surface; and an outer peripheral part transfer surface that forms an outer peripheral part stretching to the inclination part transfer surface. The pair of molding molds when being closed includes a cavity that is formed by an optical functional part molding cavity formed by the optical functional part transfer surfaces; a connecting part molding cavity formed by the connecting part transfer surfaces; and an edge part molding cavity formed by the inclination part transfer surfaces and the outer peripheral part transfer surfaces stretching to the inclination part transfer surfaces. The inclination part transfer surfaces of the first mold and the second mold have inclination angles that are widened such that the thickness of the optical device in an optical axis direction increases from the connecting part transfer surface side toward the outer peripheral part transfer surface side, respectively. The apparatus includes a compression molding step of filling the optical functional part transfer surface of one mold of the pair of molding molds with a compression molding material having a smaller volume than the volume of the optical device, expanding the compression molding material while the molding molds being closed to transfer the shapes of the optical functional part transfer surfaces and the connecting part transfer surfaces of the molding molds to the compression molding material, and forming a protrusion part formed by a portion of the compression molding material bulging from the connecting part molding cavity to the edge part molding cavity side, and an injection molding step of filling the edge part molding cavity with a molten injection molding material in a state where the pair of molding molds are closed, and forming an injection-molded part at an outer periphery of the compression-molded compression molding material. The protrusion part is biased such that, when a cross-sectional shape of the compression molding material that has protruded from the connecting part molding cavity to the edge part molding cavity is divided into two by a perpendicular bisector that is perpendicular to an optical axis and bisects the thickness of the connecting part molding cavity in the optical axis direction, a side with a larger area is defined as HS1, and a side with a smaller area is defined as HS2, the area of the HS1 is larger than or equal to 60% of the cross-sectional area of the protruded compression molding material.

(3) There is provided an optical device including a circular optical functional part that has an optical axis as a center; a connecting part that is annularly formed at an outer peripheral edge of the optical functional part; and an edge part that is annularly formed at an outer peripheral edge of the connecting part. The optical functional part includes a first optical functional surface and a second optical functional surface that have the function of refracting a light beam. The edge part is constituted by an inclination part stretching to the connecting part, and the other outer peripheral part. In an optical device cross-section including the optical axis, each of the inclination parts on the side of the first optical functional surface and the second optical functional surface has an inclination angle such that the thickness of the optical device in the optical axis direction increases from the connecting part side toward the outer peripheral part, the optical functional part and the connecting part are formed by compression-molding a compression molding material, the edge part is formed mainly by injection molding, and a border plane is formed within the edge part by a protrusion part formed by an injection molding material and the compression molding material protruding from the connecting part toward the edge part, and the protrusion part is biased such that, when a cross-section of the protrusion part is divided into two by a perpendicular bisector that is perpendicular to the optical axis and bisects the thickness of the connecting part, a side with a larger area is defined as HS1, and a side with a smaller area is defined as HS2, the area of the HS1 is larger than or equal to 60% of the cross-sectional area of the protruded compression molding material.

According to the invention, high-quality optical devices are always stably obtained without the flow of molten resin within the injection molding cavity being hindered by the protrusion of the outer peripheral edge of the optical functional part after the compression molding.

DESCRIPTION OF THE PREFERRED EMBODIMENTS

Figure 1:
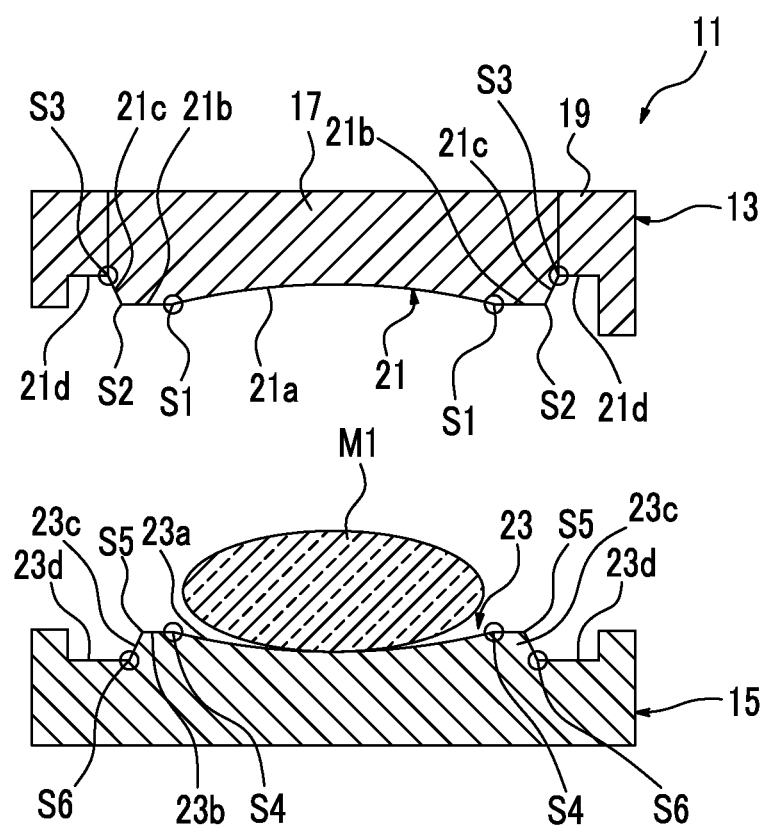
FIG. 1 is a view for illustrating an embodiment of the invention, and is a schematic cross-sectional view of molding molds that mold an optical functional member as an optical device.

An embodiment of the invention will be described below in detail referring to the drawings.

Here, a case where a plastic lens that is an example of an optical device is molded between a pair of molding molds including a first mold and a second mold will be described. A process for manufacturing an optical device has two steps including a compression molding step of compression-molding a preform formed in advance in a spherical shape or a shape close to the final shape of an optical functional part, and an injection molding step of molding an edge part on a lens outer peripheral part through injection molding after that.

<First Manufacturing Method>

FIG. 1 is a view for illustrating the embodiment of the invention, and is a schematic cross-sectional view of molding molds that mold an optical device as the optical device.

A molding mold 11 includes a first mold 13 and a second mold 15. A state shown in FIG. 1 is a state where a compression molding material M1 is placed in the second mold 15. Here, the compression molding material M1 is a preform made of a synthetic resin material having thermoplasticity and translucency.

The first mold 13 has a columnar core part 17, and a substantially cylindrical trunk part 19 that has the core part 17 inserted thereinto and is fitted to the core part 17 so as to be relatively movable. In the first mold 13, during compression molding, the core part 17 and the trunk part 19 are fixed to each other and are prevented from being relatively movable. Additionally, a bottom end surface of the first mold 13 and a top end surface of the second mold 15, are respectively formed with a first transfer surface 21 and a second transfer surface 23 for transferring a predetermined shape of an optical functional part to the compression molding material M1.

The first transfer surface 21 includes a first optical functional part transfer surface 21a that falls within a range closer to an inner peripheral side than a terminal part S1 of an optical functional surface of the core part 17, a connecting part transfer surface 21b closer to an outer periphery than the terminal part S1 of the optical functional surface and closer to the inner peripheral side than S2, a first inclination part transfer surface 21c that has an inclination angle with respect to the optical axis from S2 to S3, and a first outer peripheral part transfer surface 21d that falls within a range on an outer peripheral side of S3. Similarly, the second transfer surface 23 includes a second optical functional part transfer surface 23a that falls within a range closer to an inner peripheral side of a terminal part S4 of an optical functional surface, a connecting part transfer surface 23b from the terminal part S4 of the optical functional part transfer surface to an end part S5 of a connecting part, a second inclination part transfer surface 23c that has an inclination angle with respect to the optical axis from the end part S5 of the connecting part to S6, and a second outer peripheral part transfer surface 23d that falls within a range closer to an outer peripheral side than S6.

Figure 2:
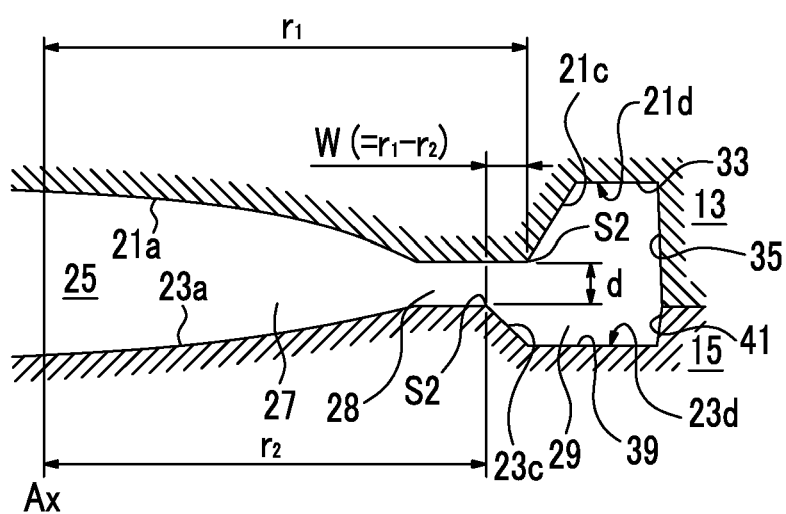
FIG. 2 is a partially enlarged cross-sectional view of the molding molds in a state where the molds of the invention are closed.

FIG. 2 is a partially enlarged cross-sectional view of the molding molds in a state where the molds of the invention are closed.

A cavity 25 serving as an optical device molding cavity is formed between the first transfer surface 21 and the second transfer surface 23 that are arranged to face each other. The cavity 25 has an optical functional part molding cavity 27 that is formed between the first optical functional part transfer surface 21a and the second optical functional part transfer surface 23a, an annular connecting part molding cavity 28 that is formed between the first connecting part transfer surface 21b and the second connecting part outer peripheral part transfer surface 23b that are connected to an outer peripheral edge of the optical functional part molding cavity 27, and an edge part molding cavity 29 that is formed from the first inclination part transfer surface 21c and the first outer peripheral part transfer surface 21d stretching thereto, and the second inclination part transfer surface 23c and the second outer peripheral part transfer surface 23d that stretches thereto.

The end part S2 of the core part 17 is located at a position with a radius $r_1$ from an optical axis Ax of an optical functional member to be formed, and the end part S5 of the second mold 15 is located at a position with a radius $r_2$ from the optical axis Ax. Accordingly, the end parts S2 and S5 are arranged so as to deviate in the radial direction by a distance W ($=r_1-r_2$) when the end parts are overlapped with each other in a clamping direction (in the same direction as the optical axis Ax). A distance W is set to a range of $0.5<W/d<2$ with respect to the thickness d of a connecting part between the connecting part molding cavity 27 and the edge part molding cavity 29. In addition, the distance is preferably set to $0.8<W/d<2$ and more preferably set to a range of $0.9<W/d<2$. A required sufficient lens diameter can be ensured by setting the distance to the above upper limit, and the compression molding material M1 can be efficiently directed to a specific direction to be described below by setting to the above lower limit. Additionally, as compression speed becomes faster, it is desirable to set the value of w/d to a larger value.

The edge part molding cavity 29 is formed by the first inclination part transfer surface 21c that is connected to the end part S2 of the first mold 13, a first flatness transfer surface 33 and a first side end transfer surface 35 that constitute the first outer peripheral part transfer surface 21d, a second inclination part transfer surface 23C that is connected to the end part S5 of the second mold 15, and a second flatness transfer surface 39 and a second side end transfer surface 41 that constitutes the second outer peripheral part transfer surface. The first inclination part transfer surface 21c and the second inclination part transfer surface 23C that are connecting portion, which are the portions of the edge part molding cavity 29 and are connected to the connecting part molding cavity 28, have a cross-sectional shape that expands outward from the center of the cavity 25 in a cross-section including the lens optical axis Ax.

The compression molding cavity 25 is formed so as to be thinner than the maximum thickness of the injection molding cavity 29 in the direction of the optical axis Ax.

Next, a compression molding step using the above molding molds will be described.

Figure 3A:
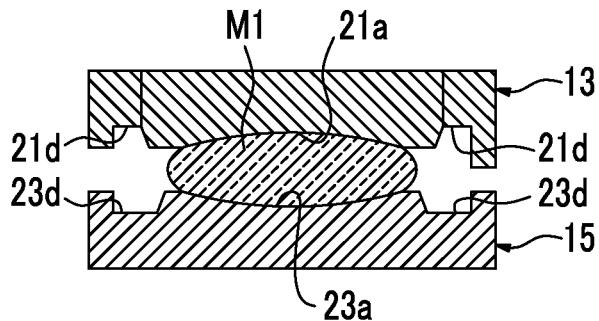
FIGS. 3A, 3B, and 3C are explanatory views stepwisely showing a compression molding step of the invention.

In the compression molding step, first, as shown in FIG. 3A, the first mold 13 and the second mold 15 are moved relative to each other so that both approach each other. Then, the compression molding material M1 heated to a temperature equal to or higher than a glass transition temperature is pressed between the first optical functional part transfer surface 21a of the first mold 13 and the second optical functional part transfer surface 23a of the second mold 15. As a result, the shapes of a pair of front and back optical functional surfaces are transferred to the compression molding material M1.

Figure 3B:
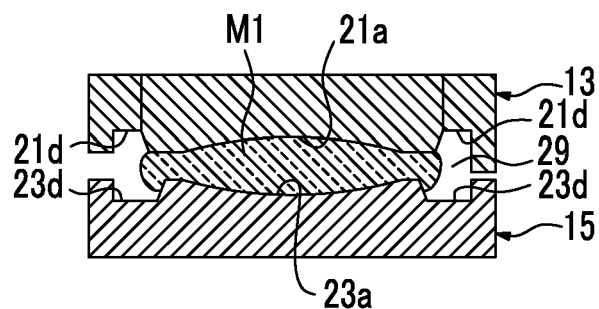

Next, as shown in FIG. 3B, the first mold 13 and the second mold 15 are made to further approach each other. Then, the compression molding material M1 is pushed and widened between the first optical functional part transfer surface 21a and the second optical functional part transfer surface 23a, and an outer peripheral edge part of the compression molding material M1 enters the edge part molding cavity 29 defined between the first outer peripheral part transfer surface 21d and the second outer peripheral part transfer surface 23d.

Figure 3C:
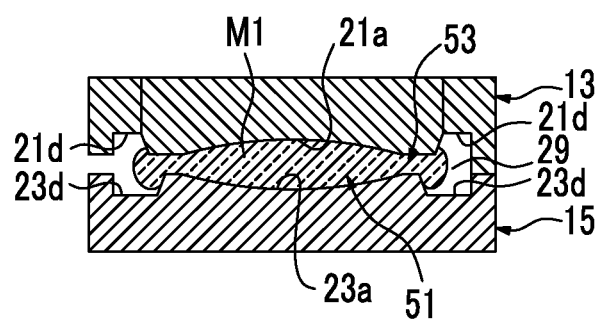

Moreover, as shown in FIG. 3C, the first mold 13 and the second mold 15 are made to approach each other to a state closer to molding closing. Then, since the outer peripheral edge part of the compression molding material M1 is opened from the compressive force between the first optical functional part transfer surface 21a and the second optical functional part transfer surface 23a, the compression molding material is held in a state where the thickness thereof does not vary while being slightly inflated in the direction of the optical axis. As a result, the outer peripheral edge part of the compression molding material M1 enters a space between the first outer peripheral part transfer surface 21b and the second outer peripheral part transfer surface 23b, and is molded in a state where the outer peripheral edge part has bulged into the edge part molding cavity 29.

Figure 4A:
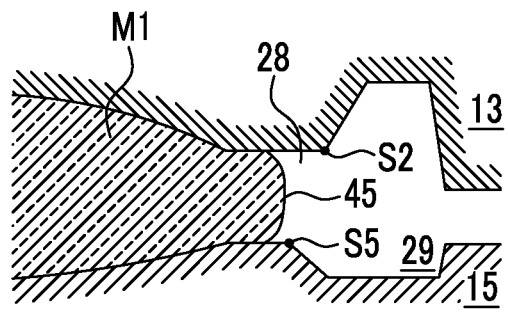
FIGS. 4A, 4B, and 4C are explanatory views stepwisely showing the state of bulging of a compression molding material of the invention.
Figure 4B:
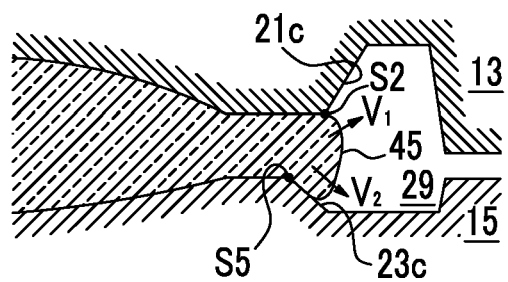
Figure 4C:
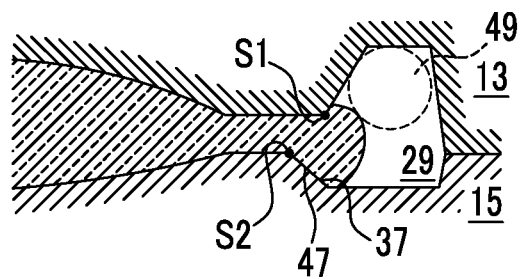

FIGS. 4A, 4B, and 4C are explanatory views stepwisely showing the state of bulging of the compression molding material M1 of the invention. In the compression molding step, as shown in FIG. 4A, with the progress of the compression molding of the compression molding material M1, a bulging end 45 of the compression molding material M1 moves from the connecting part molding cavity 28 toward the edge part molding cavity 29.

Then, if the bulging end 45 of the compression molding material M1 passes through the end part S5, as shown in FIG. 4B, the flow velocity $V_2$ of the compression molding material M1 on the side of the second inclination part transfer surface 23c connected to the end part S5 become relatively faster than the flow velocity $V_1$ of the compression molding material on the side of the end part S2. That is, a flow velocity difference is caused with respect to respective spreading directions when the compression molding material M1 bulges while spreading, and thereby, the bulging end 45 of the compression molding material M1 is biased in a protruding direction toward the second mold 15 side and spreads gradually into the edge part molding cavity 29.

As a result, when the molds are brought into a closed state as shown in FIG. 4C, the edge part molding cavity 29 is formed in a state where a protrusion part 47 of the compression molding material M1 is biased to the second mold 15 side along the second inclination part transfer surface 23c. As a result, a space 49 for flow of a large amount of injection molding material is ensured on the first mold 13 side opposite to a side where the protrusion part 47 of the edge part molding cavity 29 is formed. Since the space 49 for flow is formed on the side opposite to the side where the protrusion part 47 is formed, the space for flow is not easily influenced by space occupancy caused by variation or the like in the amount of the protrusion part 47.

Figure 7:
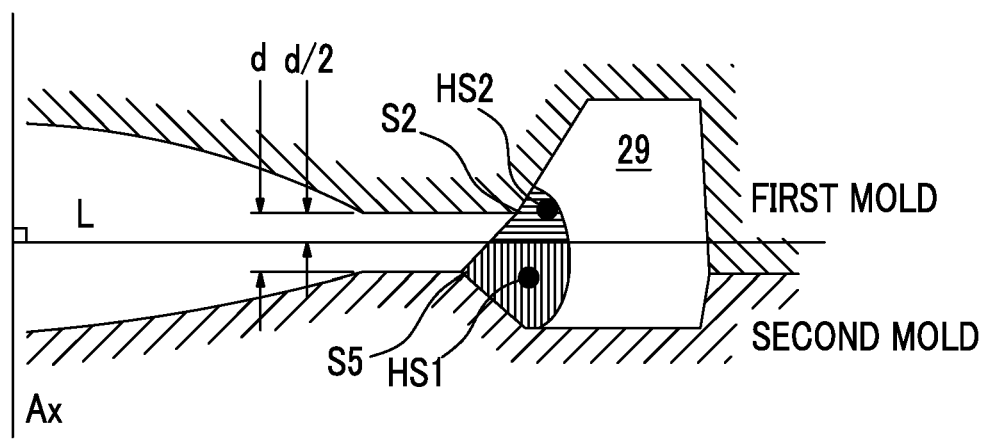
FIG. 7 is an explanatory view showing one cross-section of the resin that has protruded from a connecting part molding cavity to an edge part molding cavity in an OZ cross-section of the invention.

In addition, the shape of the outer peripheral edge part of the compression molding material M1 that has protruded from the above connecting part molding cavity to the edge part molding cavity varies depending on compression amount, compression speed, the volume of the compression molding material M1 to be supplied, or the like in the compression molding step, and becomes a variable shape. As a countermeasure against this, as shown in FIG. 7, when the cross-sectional area of the protrusion part 47 is seen in an OZ cross-section including an optical-axis position O that is the center of the optical functional part molding cavity and a maximum protrusion position Z, it is preferable to set the biased amount of the protrusion part 47 such that the cross-sectional area of a cross-section on the biased side out of two cross-sections HS1 and HS2 obtained by bisecting the cross-section of the protrusion part 47, which has protruded to the edge part molding cavity 29, using a perpendicular bisector L perpendicular to the optical axis Ax that bisects the thicknesses of the end parts S2 and S5 of the inclination part transfer surfaces in the optical axis direction is made large and such that the cross-sectional area (HS1) of the cross-section on the biased side is made to be 60% or more of the cross-sectional area (HS1+HS2) of the protruded resin. As a result, the effect that the protruded resin is biased can be ensured, and the shape of the outer peripheral edge part of the compression molding material M1, which has protruded from the connecting part molding cavity to the edge part molding cavity, no longer becomes unstable.

When the area of the protrusion part is less than 60%, the biasing effect cannot be sufficiently ensured, and if an attempt to stably ensure a flow path for injection molding resin is made, it is necessary to increase the external diameter of the optical device. Therefore, it becomes difficult to enhance space efficiency. As a result, there is a probability that the shape of the outer peripheral edge part of the compression molding material M1, which has protruded from the connecting part molding cavity to the edge part molding cavity, becomes unstable.

The above compression molding step is completed if the first mold 13 and the second mold 15 are brought into a mold-closed state. In this compression step, the optical functional part 51 of the optical device, and the connecting part 53 on the outer peripheral side of the optical functional part 51 are formed. The optical functional part 51 and the connecting part 53 are integrally formed by compressing the compression molding material M1. Additionally, in the above compression molding step, the temperature of the compression molding material M1 is higher than the glass transition point temperature. Therefore, the respective transfer surfaces of the molding tools are favorably transferred to the compression molding material M1.

Subsequently, the injection molding step is carried out.

Figure 5A:
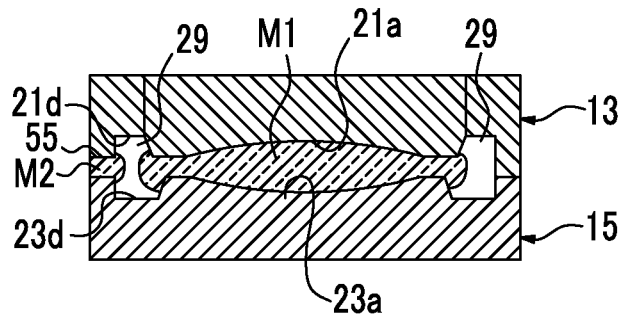
FIGS. 5A, 5C, and 5C are explanatory views stepwisely showing an injection molding step of the invention.

The injection molding step is performed remaining in a state where the first mold 13 and the second mold 15 are closed. As shown in FIG. 5A, an injection molding material M2 is injected into the edge part molding cavity 29 demarcated between the first outer peripheral part transfer surface 21d and the second outer peripheral part transfer surface 23d from an injection gate 55 provided in the first mold 13. The edge part molding cavity 29 is annularly formed on the outer peripheral side of the compression molding material M1. After the first mold 13 and the second mold 15 are closed in the compression molding step, the injection molding material M2 is injected into the injection molding cavity 29 before the temperature of the compression molding material M1 becomes equal to or lower than the glass transition temperature. That is, the adhesion force between the compression molding material M1 and the injection molding material M2 can be strengthened by supplying the compression molding material M2 to the edge part molding cavity 29 while the injection molding material M1 is in a half-solid state.

Figure 5B:
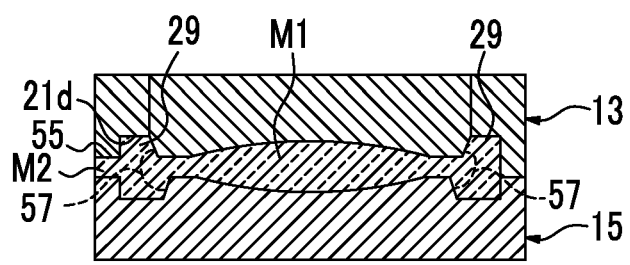

The injected injection molding material M2, as shown in FIG. 5B, spreads so as to surround an outer periphery of the compression molding material M1 through the edge part molding cavity 29, and is coupled with the compression molding material M1. At this time, the compression molding material M1 and the injection molding material M2 firmly couple both interfaces 57 with the injection pressure of the injection molding material M2. An edge part of the optical device is molded in this step.

Figure 5C:
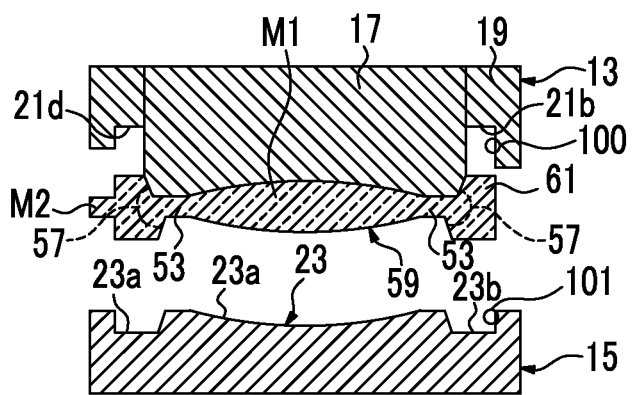

After the injection molding, the first mold 13 and the second mold 15 are cooled remaining in a state where the molds are closed, and the integrated compression molding material M1 and injection molding material M2 are sufficiently cured. Thereafter, as shown in FIG. 5C, the first mold 13 and the second mold 15 are brought into a mold release state. That is, the first mold 13 is separated from the second mold 15, and the core part 17 of the first mold 13 is further moved in an axial direction relative to the trunk part 19. Accordingly, an optical device 59 to which the second transfer surface 23 of the second mold 15 is transferred is peeled from the second mold 15, and an edge part 61 of the optical device 59 is peeled from the first outer peripheral part transfer surface 21*d* in the trunk part 19.

The molding molds of the above configuration form a mold release control structure through the injection molding using the edge part molding cavity. In the injection molding, the degree of freedom in the shape of the cavity is high. Therefore, the mold release resistance of one (first mold in the case of the present configuration example) of molds is made high, and the mold release resistance of the other mold (second mold) is made low. As a result, a molded product stably remains in one mold (first mold).

That is, since the draft angle of a first side end transfer surface 100 of the first mold that transfers a side end surface of an outer shape portion of the optical device is smaller than the draft angle of a second side end transfer surface 101 of the second mold that transfers the outer shape portion, the mold release resistance on the first side end transfer surface 100 becomes large. As a result, a molded product is held on the first mold side when the molds are opened.

Since the mold release resistance on the side of the injection molding can be freely adjusted by adopting the above step in this way, it is possible to reliably leave the molded product in one mold.

A molded optical device 59 is taken out through the above step.

According to the above manufacturing method, the injection molding material M2 can be spread over the whole edge part molding cavity 29, and the edge part 61 can always be stably formed.

Generally, in the compression molding step, when the preform of the compression molding material M1 is placed at a position eccentric from the center of the cavity, an outer peripheral edge part of the preform after compression molding has the amount of protrusion to the edge part molding cavity 29 that is not uniform in the circumferential direction. That is, in a preform of a compression molding part, the amount of protrusion of compressed resin varies depending on the weight (volume) deviation of the preform or the precision of placement in the molds.

Figure 6:
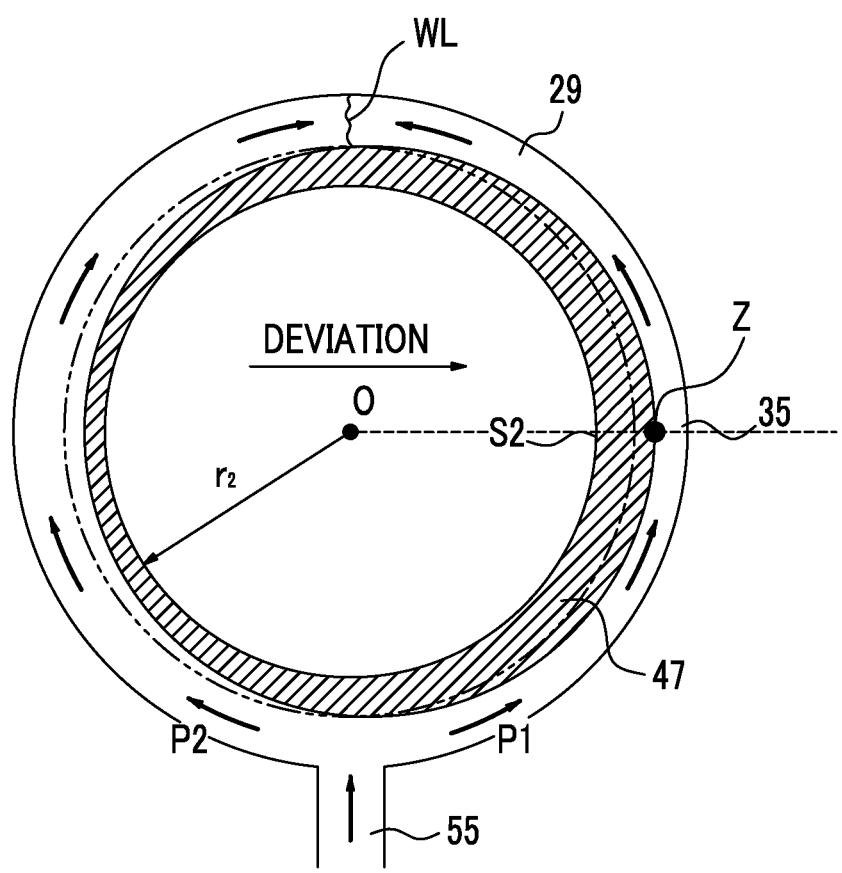
FIG. 6 is an explanatory view schematically showing the state of protrusion of the compression molding material of the invention to an injection molding cavity.

FIG. 6 is an explanatory view schematically showing the state of protrusion of the compression molding material M1 to the edge part molding cavity 29. In the drawing, a case where the center of a preform is set at a position deviated in a rightward direction in the drawing from the optical-axis position O that is the center of the optical functional part molding cavity is shown, and the protrusion part 47 that has protruded further toward the outer peripheral side than the end part S5 is shown as a hatched area.

The injection molding material injected into the edge part molding cavity 29 from the injection gate 55 branches and flows in directions of P1 and P2 in the drawing in the edge part molding cavity 29. The protrusion part 47 has a maximum protrusion position Z where the amount of protrusion thereof is the largest on the side where the center of the preform has deviated, and has a little amount of protrusion on the side opposite to the maximum protrusion position. Accordingly, the flow path of the injection molding material tends to become narrower in the direction of P1 than the direction of P2.

However, even in such a case, as shown in FIG. 7, the protruded resin in a cross-section of the optical-axis position O and the maximum protrusion position Z is biased by the action of the end parts S2 and S5 so that 60% or more of the cross-sectional area of the protruded compression molding resin is included on the second mold side of the edge part molding cavity 29. Accordingly, the volume capable of sufficiently absorbing the amount of protruded resin in consideration of deviation factors of the amount of protrusion can be ensured on the first mold side of the edge part molding cavity 29, and the flow of the injection molding resin can be appropriately obtained. Therefore, the injection molding material is hardly influenced by the bias of the protrusion part 47, and the flow of the injection molding resin within the edge part molding cavity 29 is stabilized. As a result, the edge part molding cavity from the injection gate 55 is filled with the injection molding material, and the edge part is always molded in a constant shape. Additionally, the generation position of a weld line WL is stabilized at the remotest position of the injection molding cavity from the injection gate 55.

Moreover, the deviation in the amount of protrusion can be absorbed by biasing the protruded resin. This also leads to increasing the permissible amount of volume deviation of a compression molding preform to be loaded in the compression molding. In related-art compression molding, in order to control the quality of molded products, the volume management of a preform is one of major problems. Since this becomes one of the factors of an increase in costs, a cost-cutting effect can also be obtained.

As described above, according to the first manufacturing method, the flow of the molten resin within the edge part molding cavity is no longer hindered by the protrusion of the outer peripheral edge of the connecting part after the compression molding. Therefore, occurrence of poor parts can be reduced. Additionally, according to the manufacturing method of the invention, a high-quality optical device can always be stably produced, efficiently employing the advantages of the compression molding and the injection molding.

In addition, synthetic resin having translucency is desirable as the compression molding resin.

The optical device as in the invention is not used as a reflecting surface, but is used to obtain mainly a refraction function of light. Particularly, in order to obtain predetermined imaging performance, combining a plurality of optical devices is performed. Therefore, high translucency is desired for the optical devices. Although it is preferable that the translucency of an optical device is higher, if internal transmittance every 1 mm in thickness is 70% or more, the optical devices are available for a wide range of applications, which is more preferable. In contrast, when the internal transmittance every 1 mm in thickness of an optical device is 70% or less, since the loss of light quantity becomes large, applications may be limited.

<Second Manufacturing Method>

Next, another example in which the protruding direction of the protrusion part is deflected by changing the inclination angle of the inclination part transfer surface corresponding to the connected portion of the edge part molding cavity to the connecting part molding cavity will be described.

Figure 8:
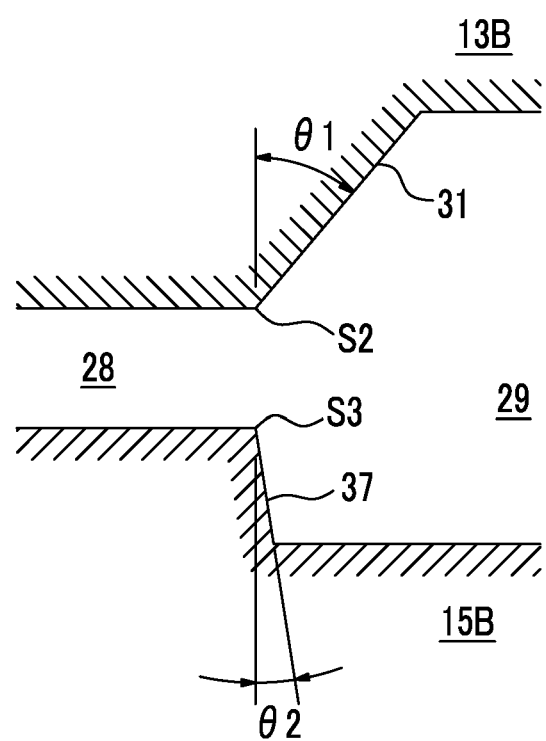
FIG. 8 is a cross-sectional view of a connecting portion between a compression molding cavity and the injection molding cavity in the molding molds of the invention.

FIG. 8 is a cross-sectional view of the connecting part molding cavity and the edge part molding cavity in molding molds including a first mold 13B and a second mold 15B.

In this configuration example, the end parts S2 and S5 overlap each other in a mold-closing direction (optical axis direction). Additionally, when the angle formed between the inclination direction of a first inclination part transfer surface 31 connected to the outer peripheral side from the end part S2 of the first mold 13B, and the optical axis Ax (synonymous with the mold-closing direction) of the optical device shown in FIG. 2 is $\theta_1$, and the angle formed between the inclination direction of a second inclination part transfer surface connected to the outer peripheral side from the end part S5 of the second mold 15B and the mold-closing direction is $\theta_2$, the relationship of $\theta_1 > \theta_2$ is established.

In addition, $\theta_1$ satisfies $30° \leq \theta_1 < 90°$ and preferably $45° \leq \theta_1 < 90°$, and $\theta_2$ satisfies $0.5° \leq \theta_2 \leq 45°$ and preferably $0.5° \leq \theta_2 \leq 30°$. By setting the angles to the above ranges, the compression molding material that has protruded from the connecting part molding cavity is smoothly made to bulge to the edge part molding cavity 29, to improve the joining strength with the injection molding material. Additionally, the above relationship can be serially adjusted in conformity with the relationship of the protrusion speed of the resin based on the viscosity and compression speed of the resin.

Figure 9:
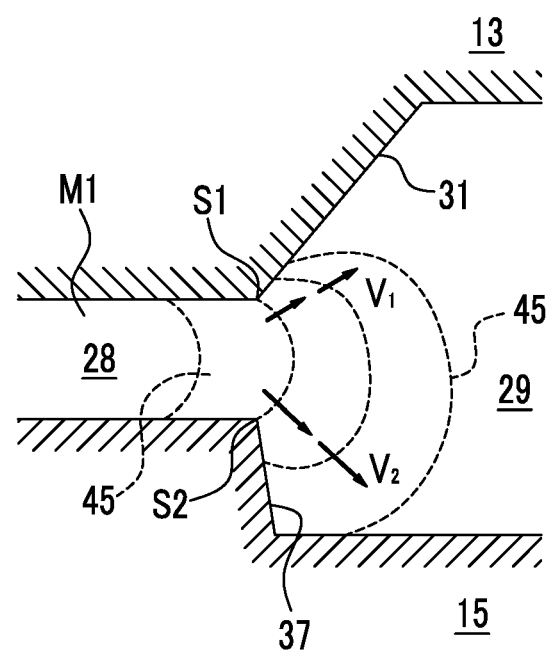
FIG. 9 is an explanatory view schematically showing a state where the compression molding material of the invention bulges from the compression molding cavity to the injection molding cavity.

FIG. 9 is an explanatory view schematically showing a state where the compression molding material M1 bulges and protrudes to the edge part molding cavity 29 from the compression molding cavity. The flow velocity $V_2$ of the compression molding material M1 on the side of the second inclination part transfer surface 37 connected to the end part S5 become relatively faster than the flow velocity $V_1$ of the compression molding material on the side of the end part S2. That is, a flow velocity difference is caused with respect to respective spreading directions when the compression molding material M1 bulges while spreading, and thereby, the bulging end 45 of the compression molding material M1 is deflected in the protruding direction toward the second mold 15 side and is gradually biased so as to spread into the edge part molding cavity 29.

According to the present manufacturing method, similar to the first manufacturing method, the injection molding material M2 can be spread over the whole edge part molding cavity 29, and the edge part 61 can always be stably formed. Additionally, since the protrusion part 47 is biased in the edge part molding cavity, the flow path for the injection molding material is stably and largely ensured even if the amount of protrusion of the protrusion part 47 varies. Therefore, the injection molding material is hardly influenced by the bias of the protrusion part 47.

Therefore, when the maximum protrusion position Z of the compression molding material M1 for the optical device is seen in a cross-section including the optical axis, it is preferable to set the biased amount of the protrusion part 47 such that, if the cross-section of the protrusion part that has protruded into the L edge part molding cavity 29 is divided into two by the perpendicular bisector that is perpendicular to the optical axis Ax and bisects the thickness of the end parts S2 and S5 of the inclination part transfer surfaces in the optical axis direction, 60% or more of the cross-sectional area of the protrusion part is included in the bias direction. In addition, in FIG. 6, the deviation direction of the preform the maximum protrusion position is referred to as Z. However, the position of Z is not limited to this, and the portion where the cross-sectional area of the protruded compression molding material M1 the maximum protrusion position becomes the maximum is referred to as Z.

Figure 10:
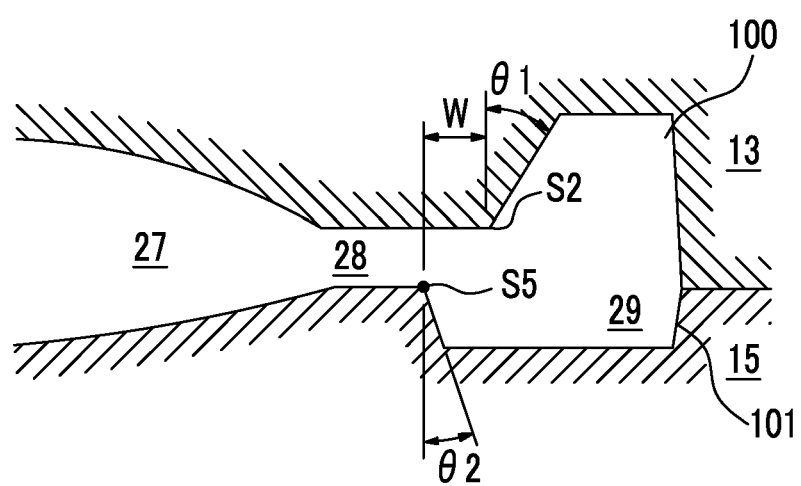
FIG. 10 is a cross-sectional view showing the relationship between angles $\theta_1$ and $\theta_2$ of the invention and the relationship between end parts S2 and S5.

Additionally, as shown in FIG. 10, if application is made to molding tools where the end part S5 in the first manufacturing method is arranged further toward the center side of the cavity than the end part S2 while maintaining the relationship between the above angles $\theta_1$ and $\theta_2$, the edge part can be stably molded without being synergistically influenced by the protrusion part.

In this way, a plurality of means for biasing the protrusion part that has protruded from the connecting part molding cavity into the edge part shaping cavity in arbitrary directions are allowed, and combinations thereof are freely allowed within a desired range.

Figure 11:
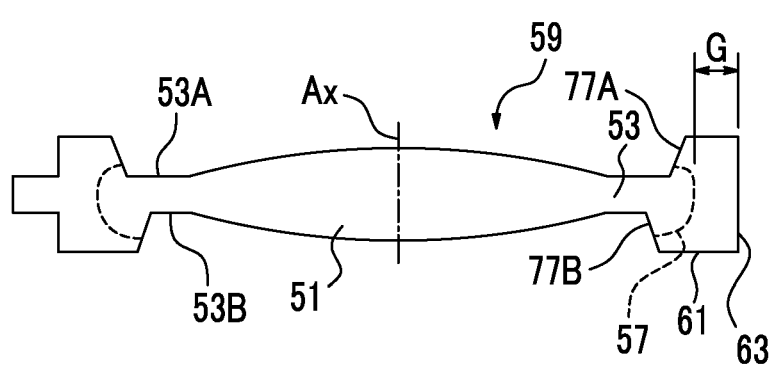
FIG. 11 is a cross-sectional view including an optical axis of the optical device.

FIG. 11 is a cross-sectional view including the optical axis Ax of the optical device molded by the above first manufacturing method. The optical device 59 is made of a plastic material having the circular optical functional part 51 that has the optical axis as a center thereof, the connecting part 53 that is annularly formed at the outer peripheral edge of the optical functional part 51, and the edge part 61 that is annularly formed at the outer peripheral edge of the connecting part 53, and is connected with the optical functional part 51 by the connecting part 53.

In an optical device cross-section including the optical axis Ax, the optical functional part 51 has a pair of optical functional surfaces. The connecting part 53 has a flat connecting surface 53A and a flat connecting surface 53B. The side surface of the edge part 61 on the side of the connecting part 53 has inclination parts 77A and 77B that are inclined with respect to the optical axis Ax.

Additionally, as for the optical device 59, in the above optical device cross-section, a boundary point between the connecting surface 53A of the connecting part 53 and the inclination part 77A of the edge part 61, and a boundary point between the second connecting surface 53B of the connecting part 53 and the lower inclination part 77B of the edge part 61 are on different lines in the optical axis direction and have different distances to the optical axis Ax.

In addition, the optical device molded by the second manufacturing method is not shown. However, similar to the above, in the above optical device cross-section, a boundary point between the connecting surface 53A of the connecting part 53 and the upper inclination part of the edge part 61, and a boundary point between the connecting surface 53B of the connecting part 53 and the lower inclination part of the edge part 61 are on the same line in the optical axis direction and have the same distance to the optical axis Ax. Also, as seen in a cross-section including the optical axis of the maximum protrusion position Z of the compression molding material, it is preferable to set the biased amount of the protrusion part 47 such that, if the cross-section of the protrusion part that has protruded into the edge part molding cavity 29 is divided into two by the perpendicular bisector that is perpendicular to the optical axis Ax and bisects the thickness of the end parts S2 and S5 of the inclination part transfer surfaces in the optical axis direction, the inclination part in the bias direction including 60% or more of the cross-sectional area of the protrusion part has a larger absolute value of an inclination angle.

An interface 57 of the edge part 61 between the compression molding material M1 and the injection molding material M2 has a protrusion margin dimension G of at least 0.2 mm or more from an outermost peripheral end part 63 of the edge part 61 over the whole circumference. As a result, the aforementioned flow of the injection molding material M2 in the edge part molding cavity is not hindered. Additionally, since there is no case where the compression molding material M1 protrudes from the edge part molding cavity of the molds and arrives at the mating face of the pair of molds while the molding molds being closed for compression molding, there is no concern about damage of the molding molds.

Figure 12:
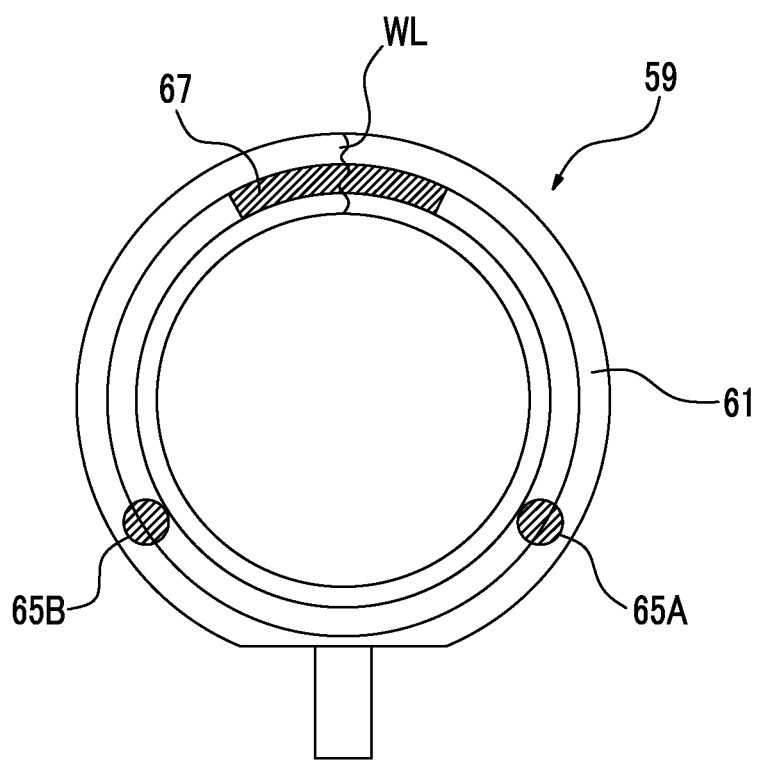
FIG. 12 is a plan view of a molded optical device.

FIG. 12 is a plan view of the molded optical device. The edge part 61 of the optical device 59 is formed with joining parts 65A, 65B, and 67, such as a projecting receiving surface or a batten that abuts against a lens barrel part when the optical device 59 is accommodated in the lens barrel part, or a projection for connecting with front and rear lenses using a fitting structure.

If a configuration in which the weld line WL is arranged in any of these joining parts is adopted, the portion of the weld line WL with weak strength is overlapped with and reinforced by a thick region. According to the above-described molding method, since the weld line WL is always stably arranged at a fixed position, the deterioration of strength caused by the weld line WL can be reliably prevented.

In addition, the resin injected from the gate is bisected and the injection molding cavity is filled with the resin at the weld line WL. Then, surfaces where the respective resins join each other within the cavity are used as the weld line. Although this weld line is clearly shown in the drawing, it should be noted that it is also possible make the weld line inconspicuous to such a level that visual confirmation is not possible by controlling molding conditions, such as resin temperature, injection speed, and pressure.

When the injection molding material M2 is the same material as the compression molding material M1, machine properties and optical properties become almost the same properties. On the contrary, various effects can be expected by giving different properties to the injection molding material M2 with respect to the compression molding material M. For example, the following effects are considered:

an optical absorption effect caused by a colorant;

an optical diffusion effect caused by a mixed material obtained by mixing particulate matter having a refractive index different from a resin material into the resin material, and control of incidence and reflection properties of the interface caused by intentionally causing a difference between the refractive indexes of the compression molding material M1 and the injection molding material M2.

In this way, the invention is not limited to the above embodiments, and mutual combinations of the respective components of the embodiments, and alterations or applications by those skilled in the art, which are based on the description of the specification and well-known techniques, are scheduled by the invention and are included in the scope to be protected. For example, although the convex lens has been illustrated and described in the above examples, a concave lens may be adopted. Even in such a case, the same effects as above are obtained.

Moreover, in an optical component made by a molding method in which the compression molding and the injection molding of the invention are combined, the optical functional part and the connecting part formed by the compression molding are required to ensure shapes with a significant thickness in the optical direction that cannot be molded in the injection molding, and the edge part formed by the injection molding is required to ensure such a thickness that the flow of the resin is not hindered. However, for example, an optical device having a complicated shape that is difficult to be made in the compression molding like the fitting between lenses for improving assembling suitability can be realized. As is clear from the above, in the optical device utilizing the technique of the invention, the thinnest portion of the optical device in the optical axis direction is included in the optical functional part or the connecting part.

Additionally, in the lens according to the invention, slimming and an improvement in assembling suitability or the like are compatible. Therefore, it is possible to provide an optical device suitable for small-sized and slim lens modules used for cellular phones, smart phones, or the like.

In the present specification, the invention has been described using the basic technique of the compression molding and the injection molding. In the respective molding techniques, the technique for moving a portion or the whole of a mold so as to follow the volume fluctuations accompanying cooling of the resin during molding is also known as a technique for improving transfer performance.

It is also possible to apply these to the invention.

As described above, the following matters are disclosed in the present specification.

(1) There is provided a manufacturing method of an optical device. Each of a pair of molding molds includes an optical functional part transfer surface that forms an optical functional part; a connecting part transfer surface that forms a connecting part stretching to an outer peripheral part of an optical functional surface; an inclination part transfer surface that forms an inclination part stretching to an outer peripheral part of the connecting part transfer surface; and an outer peripheral part transfer surface that forms an outer peripheral part stretching to the inclination part transfer surface. The pair of molding molds when being closed includes a cavity that is formed by an optical functional part molding cavity formed by the optical functional part transfer surfaces; a connecting part molding cavity formed by the connecting part transfer surfaces; and an edge part molding cavity formed by the inclination part transfer surfaces and the outer peripheral part transfer surfaces stretching to the inclination part transfer surfaces. The inclination part transfer surfaces of the first mold and the second mold have inclination angles that are widened such that the thickness of the optical device in an optical axis direction increases from the connecting part transfer surface side toward the outer peripheral part transfer surface side, respectively. The method includes a compression molding step of filling the optical functional part transfer surface of one mold of the pair of molding molds with a compression molding material having a smaller volume than the volume of the optical device, expanding the compression molding material while the molding molds being closed to transfer the shapes of the optical functional part transfer surfaces and the connecting part transfer surfaces of the molding molds to the compression molding material, and forming a protrusion part formed by a portion of the compression molding material bulging from the connecting part molding cavity to the edge part molding cavity side, and an injection molding step of filling the edge part molding cavity with a molten injection molding material in a state where the pair of molding molds are closed, and forming an injection-molded part at an outer periphery of the compression-molded compression molding material. The protrusion part is biased toward a mold of HS1 such that, when a cross-sectional shape of the protrusion part that has protruded from the connecting part molding cavity to the edge part molding cavity is divided into two by a perpendicular bisector that is perpendicular to an optical axis and bisects the thickness of the connecting part molding cavity in the optical axis direction, a side with a larger area is defined as the HS1, and a side with a smaller area is defined as HS2, the area of the HS1 is larger than or equal to 60% of the cross-sectional area of the protruded compression molding material.

(2) In the manufacturing method of an optical device according to the above (1), the inclination part transfer surfaces that form the edge part molding cavity of the molding molds have shapes that cause a flow velocity difference with respect to respective spreading directions of the compression molding material that is resin that flows through the first mold side and the second mold side, when the compression molding material bulges and protrudes from the connecting part molding cavity to the edge part molding cavity while spreading in the optical axis direction.

(3) In the manufacturing method of an optical device according to the above (1) or (2), when a radial distance from a boundary position between the connecting part transfer surface and the inclination part transfer surface of the first mold to the optical axis is defined as a first boundary position radius and a radial distance from a boundary position between the connecting part transfer surface and the inclination part transfer surface of the second mold to the optical axis is defined as a second boundary position radius, the protruded resin is biased toward a mold having a boundary position radius with a smaller value out of the first boundary position radius and the second boundary position radius.

(4) In the manufacturing method of an optical device according to any one of the above (1) to (3), when an absolute value of an inclination angle formed between the inclination part transfer surface on the side of the first mold and the optical axis is defined as $\theta_1$, and an absolute value of an inclination angle formed between the inclination part transfer surface on the side of the second mold and the optical axis is defined as $\theta_2$, $\theta_1$ and $\theta_2$ are different angles, and the protruded resin is biased toward a mold having an angle with a smaller absolute value out of the inclination angles.

(5) In the manufacturing method of an optical device according to any one of the above (1) to (4), a thinnest portion of a molding cavity of the optical device in the optical axis direction is provided in the optical functional part molding cavity or the connecting part molding cavity.

(6) In the manufacturing method of an optical device according to any one of the above (1) to (5), the compression molding step is performed by heating the compression molding material to a glass transition temperature or higher, and the injection molding step starts injection molding in a state where the compression molding material after the compression molding is at a temperature equal to or higher than the glass transition temperature.

(7) In the manufacturing method of an optical device according to any one of the above (1) to (6), the compression molding material is synthetic resin having a translucency with an internal transmittance of 70% or more per 1 mm in thickness.

(8) In the manufacturing method of an optical device according to the above (7), the compression molding material is a preform formed in advance in a shape close to the optical device.

(9) In the manufacturing method of an optical device according to any one of the above (1) to (8), the optical device is configured to include a lens.

(10) There is provided a manufacturing apparatus of an optical device that molds the optical device by using a pair of molding molds including a first mold and a second mold. Each of the pair of molding molds includes an optical functional part transfer surface that forms an optical functional part; a connecting part transfer surface that forms a connecting part stretching to an outer peripheral part of an optical functional surface; an inclination part transfer surface that forms an inclination part stretching to an outer peripheral part of the connecting part transfer surface; and an outer peripheral part transfer surface that forms an outer peripheral part stretching to the inclination part transfer surface. The pair of molding molds when being closed includes a cavity that is formed by an optical functional part molding cavity formed by the optical functional part transfer surfaces; a connecting part molding cavity formed by the connecting part transfer surfaces; and an edge part molding cavity formed by the inclination part transfer surfaces and the outer peripheral part transfer surfaces stretching to the inclination part transfer surfaces. The inclination part transfer surfaces of the first mold and the second mold have inclination angles that are widened such that the thickness of the optical device in an optical axis direction increases from the connecting part transfer surface side toward the outer peripheral part transfer surface side, respectively. The apparatus includes a compression molding step of filling the optical functional part transfer surface of one mold of the pair of molding molds with a compression molding material having a smaller volume than the volume of the optical device, expanding the compression molding material while the molding molds being closed to transfer the shapes of the optical functional part transfer surfaces and the connecting part transfer surfaces of the molding molds to the compression molding material, and forming a protrusion part formed by a portion of the compression molding material bulging from the connecting part molding cavity to the edge part molding cavity side, and an injection molding step of filling the edge part molding cavity with a molten injection molding material in a state where the pair of molding molds are closed, and forming an injection-molded part at an outer periphery of the compression-molded compression molding material. The protrusion part is biased such that, when a cross-sectional shape of the compression molding material that has protruded from the connecting part molding cavity to the edge part molding cavity is divided into two by a perpendicular bisector that is perpendicular to an optical axis and bisects the thickness of the connecting part molding cavity in the optical axis direction, a side with a larger area is defined as HS1, and a side with a smaller area is defined as HS2, the area of the HS1 is larger than or equal to 60% of the cross-sectional area of the protruded compression molding material.

(11) In the manufacturing method of an optical device according to the above (10), the inclination part transfer surfaces that form the edge part molding cavity of the molding molds have shapes that cause a flow velocity difference with respect to respective spreading directions of the compression molding material that is resin that flows through the first mold and the second mold side, when the compression molding material bulges and protrudes from the connecting part molding cavity to the edge part molding cavity while spreading in the optical axis direction.

(12) In the manufacturing apparatus of an optical device according to the above (10) or (11), when a radial distance from a boundary position between the connecting part transfer surface and the inclination part transfer surface of the first mold to the optical axis is defined as a first boundary position radius and a radial distance from a boundary position between the connecting part transfer surface and the inclination part transfer surface of the second mold to the optical axis is defined as a second boundary position radius, the protruded resin is biased toward a mold having a boundary position radius with a smaller value out of the first boundary position radius and the second boundary position radius.

(13) In the manufacturing apparatus of an optical device according to any one of the above (10) to (12), when an absolute value of an inclination angle formed between the inclination part transfer surface on the side of the first mold and the optical axis is defined as $\theta_1$, and an absolute value of an inclination angle formed between the inclination part transfer surface on the side of the second mold and the optical axis is defined as θ₂, θ₁ and θ₂ are different angles, and the protruded resin is biased toward a mold having an angle with a smaller absolute value out of the inclination angles.

(14) There is provided an optical device including a circular optical functional part that has an optical axis as a center; a connecting part that is annularly formed at an outer peripheral edge of the optical functional part; and an edge part that is annularly formed at an outer peripheral edge of the connecting part. The optical functional part includes a first optical functional surface and a second optical functional surface that have the function of refracting a light beam. The edge part is constituted by an inclination part stretching to the connecting part, and another outer peripheral part. In an optical device cross-section including the optical axis, each of the inclination parts on the side of the first optical functional surface and the second optical functional surface has an inclination angle such that the thickness of the optical device in the optical axis direction increases from the connecting part side toward the outer peripheral part, the optical functional part and the connecting part are formed by compression-molding a compression molding material, the edge part is formed mainly by injection molding, and a border plane is formed within the edge part by a protrusion part formed by an injection molding material and the compression molding material protruding from the connecting part toward the edge part, and a bias is made such that, when a cross-section of the protrusion part is divided into two by a perpendicular bisector that is perpendicular to the optical axis and bisects the thickness of the connecting part, a side with a larger area is defined as HS1, and a side with a smaller area is defined as HS2, the area of the HS1 is larger than or equal to 60% of the cross-sectional area of the protruded compression molding material.

(15) In the optical device according to the above (14), in the optical device cross-section, when a side having the first optical functional surface is defined as a first side and a side having the second optical functional surface is defined as a second side, a boundary point on a side where resin that has protruded from the connecting part is biased, out of a boundary point between a connecting surface of the connecting part on the first side and an inclined surface of the edge part, and a boundary point between a connecting surface of the connecting part of the second side and an inclined surface of the edge part, has a closer radial distance from the optical axis.

(16) In the optical device according to the above (14), in the optical device cross-section, when a side having the first optical functional surface is defined as a first side and a side having the second optical functional surface is defined as a second side, an absolute value of an inclination angle of the inclination part on a side where the protruded resin is biased, out of absolute values of inclination angles of the inclination part of the edge part on the first side and the inclination part on the second side with respect to the optical axis, is smaller.

(17) There is provided a lens module including at least one optical device according to any one of the above (14) to (16).

What is claimed is:

1. A manufacturing method of an optical device that obtains the optical device through molding processing using a pair of molding molds including a first mold and a second mold,
wherein each of the pair of molding molds includes an optical functional part transfer surface that forms an optical functional part; a connecting part transfer surface that forms a connecting part stretching to an outer peripheral part of an optical functional surface; an inclination part transfer surface that forms an inclination part stretching to an outer peripheral part of the connecting part transfer surface; and an outer peripheral part transfer surface that forms an outer peripheral part stretching to the inclination part transfer surface,
wherein the pair of molding molds when being closed includes a cavity that is formed by an optical functional part molding cavity formed by the optical functional part transfer surfaces; a connecting part molding cavity formed by the connecting part transfer surfaces; and an edge part molding cavity formed by the inclination part transfer surfaces and the outer peripheral part transfer surfaces stretching to the inclination part transfer surfaces,
wherein the inclination part transfer surfaces of the first mold and the second mold have inclination angles that are widened such that the thickness of the optical device in an optical axis direction increases from the connecting part transfer surface side toward the outer peripheral part transfer surface side, respectively,
the method comprising:
a compression molding step of filling the optical functional part transfer surface of one mold of the pair of molding molds with a compression molding material having a smaller volume than the volume of the optical device, expanding the compression molding material while the molding molds being closed to transfer the shapes of the optical functional part transfer surfaces and the connecting part transfer surfaces of the molding molds to the compression molding material, and forming a protrusion part formed by a portion of the compression molding material bulging from the connecting part molding cavity to the edge part molding cavity side, and
an injection molding step of filling the edge part molding cavity with a molten injection molding material in a state where the pair of molding molds are closed, and forming an injection-molded part at an outer periphery of the compression-molded compression molding material, and
wherein the protrusion part is biased during the compression molding step such that, when a cross-sectional shape of the protrusion part that has protruded from the connecting part molding cavity to the edge part molding cavity is divided into two by a perpendicular bisector that is perpendicular to an optical axis and bisects the thickness of the connecting part molding cavity in the optical axis direction, a side with a larger area is defined as HS1, and a side with a smaller area is defined as HS2, the area of the HS1 is larger than or equal to 60% of the cross-sectional area of the protruded compression molding material.

2. The manufacturing method of an optical device according to claim 1,
wherein the inclination part transfer surfaces that form the edge part molding cavity of the molding molds have shapes that cause a flow velocity difference with respect to respective spreading directions of the compression molding material that is resin that flows through the first mold side and the second mold side, when the compression molding material bulges and protrudes from the connecting part molding cavity to the edge part molding cavity while spreading in the optical axis direction.

3. The manufacturing method of an optical device according to claim 1,
wherein when a radial distance from a boundary position between the connecting part transfer surface and the inclination part transfer surface of the first mold to the optical axis is defined as a first boundary position radius and a radial distance from a boundary position between the connecting part transfer surface and the inclination part transfer surface of the second mold to the optical axis is defined as a second boundary position radius, the protruded resin is biased toward a mold having a boundary position radius with a smaller value out of the first boundary position radius and the second boundary position radius.

4. The manufacturing method of an optical device according to claim 2,
wherein when a radial distance from a boundary position between the connecting part transfer surface and the inclination part transfer surface of the first mold to the optical axis is defined as a first boundary position radius and a radial distance from a boundary position between the connecting part transfer surface and the inclination part transfer surface of the second mold to the optical axis is defined as a second boundary position radius, the protruded resin is biased toward a mold having a boundary position radius with a smaller value out of the first boundary position radius and the second boundary position radius.

5. The manufacturing method of an optical device according to claim 1,
wherein when an absolute value of an inclination angle formed between the inclination part transfer surface on the side of the first mold and the optical axis is defined as $\theta_1$, and an absolute value of an inclination angle formed between the inclination part transfer surface on the side of the second mold and the optical axis is defined as $\theta_2$, $\theta_1$ and $\theta_2$ are different angles, and the protruded resin is biased toward a mold having an angle with a smaller absolute value out of the inclination angles.

6. The manufacturing method of an optical device according to claim 2,
wherein when an absolute value of an inclination angle formed between the inclination part transfer surface on the side of the first mold and the optical axis is defined as $\theta_1$, and an absolute value of an inclination angle formed between the inclination part transfer surface on the side of the second mold and the optical axis is defined as $\theta_2$, $\theta_1$ and $\theta_2$ are different angles, and the protruded resin is biased toward a mold having an angle with a smaller absolute value out of the inclination angles.

7. The manufacturing method of an optical device according to claim 3,
wherein when an absolute value of an inclination angle formed between the inclination part transfer surface on the side of the first mold and the optical axis is defined as $\theta_1$, and an absolute value of an inclination angle formed between the inclination part transfer surface on the side of the second mold and the optical axis is defined as $\theta_2$, $\theta_1$ and $\theta_2$ are different angles, and the protruded resin is biased toward a mold having an angle with a smaller absolute value out of the inclination angles.

8. The manufacturing method of an optical device according to claim 1,
wherein a thinnest portion of a molding cavity of the optical device in the optical axis direction is provided in the optical functional part molding cavity or the connecting part molding cavity.

9. The manufacturing method of an optical device according to claim 1,
wherein the compression molding step is performed by heating the compression molding material to a glass transition temperature or higher, and
wherein the injection molding step starts injection molding in a state where the compression molding material after the compression molding is at a temperature equal to or higher than the glass transition temperature.

10. The manufacturing method of an optical device according to claim 1,
wherein the compression molding material is synthetic resin having a translucency with an internal transmittance of 70% or more per 1 mm in thickness.

11. The manufacturing method of an optical device according to claim 10,
wherein the compression molding material is a preform formed in advance in a shape close to the optical device.

12. The manufacturing method of an optical device according to claim 1,
wherein the optical device is configured to include a lens.

* * * * *